United States Patent
Hinton, Jr. et al.

(10) Patent No.: US 6,627,188 B1
(45) Date of Patent: Sep. 30, 2003

(54) METHOD OF REDUCING BACTERIAL ENTEROPATHOGENS IN THE CROP OF FOWL SUBJECTED TO FEED WITHDRAWAL

(75) Inventors: Arthur Hinton, Jr., Athens, GA (US); Kimberly D. Ingram, Watkinsville, GA (US); Richard Jeffery Buhr, Athens, GA (US)

(73) Assignee: The United States of America as represented by the Secretary of Agriculture, Washington, DC (US)

(*) Notice: Subject to any disclaimer, the term of this patent is extended or adjusted under 35 U.S.C. 154(b) by 27 days.

(21) Appl. No.: 09/702,222

(22) Filed: Oct. 31, 2000

Related U.S. Application Data

(60) Provisional application No. 60/169,510, filed on Dec. 7, 1999.

(51) Int. Cl.$^7$ .............................. C12N 1/20; A23K 1/61
(52) U.S. Cl. ................... 424/93.1; 424/93.45; 424/461; 424/463; 424/442; 424/482; 426/2; 426/53; 514/23; 514/54; 514/60
(58) Field of Search .............................. 426/2; 514/23, 514/54; 424/93.1, 486, 442, 93.45, 463, 461

(56) References Cited

U.S. PATENT DOCUMENTS

| | | | | |
|---|---|---|---|---|
| 5,578,584 A | * | 11/1996 | Katta et al. ................ 514/54 |
| 5,863,572 A | * | 1/1999 | Iwasaki et al. ............... 426/2 |
| 5,976,580 A | * | 11/1999 | Ivey et al. ................... 426/2 |
| 6,228,355 B1 | * | 5/2001 | Byrd et al. ............... 424/93.1 |
| 6,326,024 B1 | * | 12/2001 | Vasilatos-Younken ...... 424/442 |
| 6,342,528 B1 | * | 1/2002 | McKenzie et al. ........... 514/557 |
| 6,406,843 B1 | * | 6/2002 | Skeeles et al. ................ 435/5 |
| 6,422,174 B1 | * | 7/2002 | Horikawa et al. .......... 119/174 |
| 6,451,861 B1 | * | 9/2002 | Pimentel et al. ............ 514/703 |

OTHER PUBLICATIONS

Wegher, Ermete Antonio (DN 131:169770, CAPLUS, abstract of BR 9702631).*

McEwen, Scott et al. (Document No. 137:383906, CAPLUS) Clinical Infectious Diseases (2002), 34 (Suppl. 3), S93–S106.*

Corrier, D.E., et al., "Presence of Salmonella in the Crop and Ceca of Broiler Chickens Before and After Preslaughter Feed Withdrawal", Poultry Science, vol. 78, pp. 45–49, 1999.

Fuller, R., "The Importance of Lactobacilli in Maintaining Normal Microbial Balance in the Crop", Br. Poult. Sci., vol. 18, pp. 85–94, 1977.

Hargis, B.M., et al., "Evaluation of the Chicken Crop as a Source of Salmonella Contamination for Broiler Carcasses", Poultry Science, vol. 74, pp. 1548–1552, 1995.

Hinton, Jr., A., et al., "In Vitro Inhibition of Salmonella typhimurium and Esherchia coli 0157:H7 by an Anaerobic Gram–positive Coccus Isolated from the Cecal Contents of Adult Chickens", J. Food Protection, vol. 55, (3), pp. 162–166, Mar. 1992.

Hinton, Jr., A., et al., "Inhibition of the Growth of Salmonella typhimurium and Escherichia coli 0157:H7 on Chicken Feed Media by Bacteria Isolated from the Intestinal Microflora on Chickens", J. Food Protection, vol. 55, (6), pp. 419–423, Jun. 1992.

May, J. D., et al., "Digestive Tract Clearance of Broilers Cooped or Deprived of Water", Poultry Science, vol. 68, pp. 627–630, 1989.

Ramirez, G.A., et al., "Effect of Feed Withdrawal on the Incidence of Salmonella in the Crops and Ceca of Market Age Broiler Chickens", Poultry Science, vol. 76, pp. 654–656, 1997.

Wabeck, C.J., "Feed and Water Withdrawal Time Relationship to Processing Yield and Potential Fecal Contamination of Broilers", Poultry Science, vol. 51, pp. 1119–1121, 1972.

Byrd, J.A., et al., "Effects of Selected Organic Acids on the Control of Salmonella in Market–Age Broilers During Feed Withdrawal", Poultry Science Annual Meeting Abstracts, Poscal 78 (Supp. 1), (374), 1999.

Brock, T.D., et al., "Sugar Metabolism", Biol. of Microorganisms, Sect. 16.20, (1994), pp. 611–612.

Hinton, Jr., A., et al., "Role of Metabolic Intermediates in the Inhibition of Salmonella typhimurium and Salmonella enteritidis by Veillonella", J. Food Protection, vol. 56, (11), pp. 932–937, Nov. 1993.

Willcox, M.D.P., et al., "Biochemical Properties of Streptococcus sobrinus Reisolates from the Gastrointestinal Tract of a Gnotobiotic Rat", J. General Microb., vol. 139, pp. 929–935, 1993.

Waterman, S.R., et al., "Acid–Sensitive Enteric Pathogens Are Protected From Killing Under Extremely Acidic Conditions of pH 2.5 When They Are Inoculated Onto Certain Solid Food Sources", Applied and Environ. Microb., vol. 64, (10), pp. 3882–3886, 1998.

(List continued on next page.)

Primary Examiner—Sabiha Qazi
(74) Attorney, Agent, or Firm—John D. Fado; G. Byron Stover

(57) ABSTRACT

A method for reducing bacterial enteropathogens in fowl subjected to feed withdrawal, involving withdrawing feed from fowl and orally administering to the fowl an effective amount of a cocktail sufficient to reduce bacterial enteropathogens in the crop of the fowl, wherein the cocktail contains contains water, a carbohydrate (e.g., glucose, sucrose), and optionally a protein source, a vitamin source, an organic acid, an emulsifier, a mineral source, and mixtures thereof.

28 Claims, No Drawings

OTHER PUBLICATIONS

Edwards, C.G., et al., "*Lactobacillus nagelii* sp. nov., An Organism Isolated From Partially Fermented Wine", *International J. of Systematic and Evolutionary Microb.*, vol. 50, pp. 699–702, 2000.

Simango, C., et al., "Survival of Bacterial Enteric Pathogens in Traditional Fermented Foods", *J. Applied Bacteriology*, vol. 73, pp. 37–40, 1992.

Byrd, J.A., et al., "Effect of Feed Withdrawal on Campylobacter in the Crops of Market–Age Broiler Chickens", *Avian Diseases*, vol. 42, pp. 802–806, Feb. 24, 1998.

Soerjadi, A.S., et al., "The Influence of Lactobacilli on the Competitive Exclusion of Paratyphoid Salmonellae in Chickens", *Avian Diseases*, vol. 25, (4), pp. 1027–1033, Jun. 5, 1981.

Corrier, D.E., et al., "Survival of Salmonella in the Crop Contents of Market–Age Broilers During Feed Withdrawal", *Avian Diseases*, vol. 43, pp. 453–460, 1999.

Adams, A.W., "Magnesium Sulfate Effects on Three Strains of Egg Type Hens", *Poultry Science*, vol. 55, pp. 1808–1810, 1976.

Adams, A.W., et al., "Some Effects on Layers of Sodium Sulfate and Magnesium Sulfate in Their Drinking Water", *Poultry Science*, vol. 54, pp. 707–714, 1975.

Ziprin, R.L., et al., "Colonization Control of Lactose–Fermenting *Salmonella typhimurium* in Young Broiler Chickens by use of Dietary Lactose", Am J Vet Res, vol. 52, (6), pp. 833–837, Jun. 1991.

Hinton, Jr., A., et al., "Comparison of the Efficacy of Cultures of Cecal Anaerobes as Inocula to Reduce Salmonella typhimurium Colonization in Chicks With or Without Dietary Lactose", *Poultry Science*, vol. 70, pp. 67–73, 1991.

Stanley, V.G., et al., "Magnesium Sulfate Effects on Coliform Bacteria Reduction in the Intestines, Ceca, and Carcasses of Broiler Chickens", *Poultry Science*, vol. 71, pp. 76–80, 1992.

Hinton, Jr., A., et al., "Changes in the Normal Bacterial Flora, pH, and Weights of the Crops of Chickens Subjected to Feed Withdrawal", *PSA '98 Annual Meeting Abstracts*, (361), 1998.

Hinton, Jr., A., et al., "Feed Withdrawal and Carcass Microbiological Counts", *Virginia Poultry Conference*, pp. 49–54, Sep. 1998.

Hinton, Jr., A., et al., "Changes in the Weight, PH, and Microflora of the Crop of Turkeys Subjected to Feed Withdrawal", *Southern Poultry Science Society 20$^{th}$ Annual Meeting*, sec. S12, Jan. 1999.

Hinton, Jr., A., et al., "Effect of Feed Withdrawal on the Bacterial Flora, pH, and Weights of the Ceca of Chickens", *PSA '98 Annual Meeting Abstracts*, Poscal 77, (90), 1988.

Bryan, F.L., et al., "Health Risks and Consequences of Salmonella and Campylobacter jejuni in Raw Poultry", *J. Food Protection*, vol. 58, (3), pp. 326–344, Mar. 1995.

\* cited by examiner

US 6,627,188 B1

METHOD OF REDUCING BACTERIAL ENTEROPATHOGENS IN THE CROP OF FOWL SUBJECTED TO FEED WITHDRAWAL

This application claims the benefit of Provisional Application No. 60/169,510, filed Dec. 7, 1999.

BACKGROUND OF THE INVENTION

A method for reducing bacterial enteropathogens in fowl subjected to feed withdrawal is disclosed which involves withdrawing feed from fowl and orally administering to the fowl an effective amount of a cocktail sufficient to reduce bacterial enteropathogens in the crop of the fowl, wherein the cocktail contains water, a carbohydrate, and optionally a protein source, a vitamin source, an organic acid, an emulsifier, a mineral source, and mixtures thereof.

The contamination of broiler carcasses with human enteropathogens remains a problem in the broiler industry. The crop is one of the reservoirs for Salmonella and other Enterobacteriaceae in broiler chickens subjected to feed withdrawal (Hargis, B. M., et al., Poultry Sci., 74:1548–1552 (1995); Hinton, A., Jr., et al., "Physical, chemical, and microbiological changes in the crop of broiler chickens subjected to incremental feed withdrawal", Poultry Sci., 79:212–218 (1999)). Broilers are subjected to feed withdrawal to reduce the potential for spreading ingesta and fecal material between live animals during transport and between carcasses during processing (Wabeck, C. J., Poultry Sci., 51:1119–1121 (1972)). During feed withdrawal poultry farmers deny their animals access to feed immediately before shipping the animals to processing plants. Feed withdrawal is effective because it facilitates the emptying of the crop and other portions of the alimentary tract of the animals before the animals are placed on transport trucks.

However, one of the undesirable effects of feed withdrawal is that the natural ability of the crop to inhibit the growth of Salmonellae and other Enterobacteriaceae is reduced when the animals are denied access to feed (Ramirez, G. A., et al., Poultry Sci., 76:654–656 (1997); Hinton, A., Jr., et al., Poultry Sci., 79:212–218 (1999)). In full fed broilers, fermentation of feed in the crop creates conditions that inhibit the growth of Enterobacteriaceae (Hinton, A., Jr., et al., J. Food Prot., 55:162–166 (1992)). The decrease in the anti-Enterobacteriaceae activity of the crop during feed withdrawal is related to decreases in the crop's population of lactic acid bacteria, increases in the pH of the contents of the crop, and decreases in the concentration of acetic, propionic, and lactic acid in the crop as it is emptied of feed (Hinton, A., Jr., et al., Poultry Sci., 79:212–218 (1999); Hinton, A., Jr., et al., "Changes in the concentration of metabolic intermediates in the crop of poultry subjected to feed withdrawal", Annual Meeting of the Poultry Science Society, Poultry Sci., 78 (Suppl. 1):27 (Abstr.)(1999)).

We have discovered that providing fowl (e.g., broilers) a cocktail (containing water and a carbohydrate, for example, glucose or sucrose) while they are denied access to feed reduces the number of bacterial enteropathogens present in the crop.

SUMMARY OF THE INVENTION

A method for reducing bacterial enteropathogens in fowl subjected to feed withdrawal, involving withdrawing feed from fowl and orally administering to the fowl an effective amount of a cocktail sufficient to reduce bacterial enteropathogens in the crop of the fowl, wherein the cocktail contains water, a carbohydrate, and optionally a protein source, a vitamin source, an organic acid, an emulsifier, a mineral source, and mixtures thereof.

DETAILED DESCRIPTION OF THE INVENTION

One aspect of the present invention involves a method for reducing bacterial enteropathogens in fowl subjected to feed withdrawal, involving withdrawing feed from fowl and orally administering to the fowl a bacterial enteropathogen reducing effective amount of a cocktail (sufficient to reduce bacterial enteropathogens in the crop of said fowl), wherein the cocktail contains water, a carbohydrate, and optionally a protein source, a vitamin source, an organic acid or inorganic acid, an emulsifier, a mineral source, and mixtures thereof.

Bacterial enteropathogens include members of the Enterobacteriaceae family (e.g., salmonellae such as *Salmonella typhimurium*) and Campylobacter species (e.g., *Campylobacter jejuni* or *coli*).

The cocktail contains water, carbohydrates, and optionally other ingredients. The carbohydrate may be any carbohydrate effective in substantially reducing bacterial enteropathogens in the crops of fowl (e.g., broiler chickens) subjected to feed withdrawal (reduction in bacterial enteropathogens in comparison with untreated fowl). Such carbohydrates, which must be biologically acceptable to fowl, include monosaccharides (e.g., glucose, fructose, mannose, galactose), disaccharides (e.g., sucrose, maltose, lactose, cellobiose), and polysaccharides (e.g., starch, amylose, glycogen, dextrins).

The cocktail is administered in an amount effective to substantially reduce bacterial enteropathogens in the crops of fowl (e.g., broiler chickens) subjected to feed withdrawal (reduction in bacterial enteropathogens in comparison with untreated fowl). The effective amount of the carbohydrate in the cocktail may be readily determined by the practioner skilled in the art by following the procedures utilized below. Generally, the effective concentration of the carbohydrate is that which results in a substantial reduction in bacterial enteropathogens (e.g., Salmonella and/or other Enterobacteriaceae, and optionally Campylobacter) in the crop. For example, the cocktail may contain about 6% to about 15% (e.g., 6%–15%) glucose, preferably about 7% to about 12% (e.g., 7%–12%) glucose, more preferably about 7% to about 10% glucose (e.g., 7%–10%), most preferably about 7.5% (e.g., 7.5%) glucose, or about 1% to about 20% (e.g., 1%–20%) sucrose, preferably about 2% to about 15% (e.g., 2%–15%) sucrose, more preferably about 4% to about 10% sucrose (e.g., 4%–10%).

The optional other ingredients generally include 1–20 g/l of a protein source (e.g., enzymatically hydrolyzed protein), 1–10 g/l of a vitamin source (e.g., autolyzed yeast), 0.5–10 g/l of an organic acid (e.g., tricarboxylic acid cycle acids such as fumaric acid; without being bound by theory, the organic acid may allow the cocktail to reduce harmful bacteria in the ceca (lower intestinal tract)) or inorganic acid (e.g., phosphoric acid), 1–5 g/l of an emulsifier (e.g., polyoxyethylenesorbitans), and 0.1–1 g/l of a mineral source (e.g., magnesium salts, maganese salts). For example the cocktails may contain proteose peptone (Difco Laboratories, Detroit, Mich.); beef extract (Sigma Chemical Co., St. Louis, Mo.); yeast extract (Difco Laboratories, Detroit, Mich.); fumaric acid (Sigma Chemical Co., St. Louis, Mo.); polyoxyethylene-sorbitan monooleate (Tween 80)(Sigma Chemica Co., St. Louis, Mo.); magnesium sulfate, heptahydrate (Sigma Chemica Co., St. Louis, Mo.); and manganese sulfate, monohydrate (Sigma Chemica Co., St. Louis, Mo.). Generally the pH of the cocktails is adjusted to 6.0 with a solution of propionic acid and glacial acetic acid. The cocktails generally are autoclaved at about 121° C. for about 15 min then stored at about 4° C. until ready for use. The cocktail may also include metabolic intermediates such as organic acids (e.g., fumaric acid (about 0.01%–about 0.2%), malic acid (about 0.01%–about 0.2%)) or inorganic acids (e.g., phosphoric acid).

The fowl (e.g., poultry such as chickens, turkeys, ducks, quail, and geese) are denied access to the feed for 6 to 48 hours before being processed. Fowl will be given access to the cocktail zero to four hours before feed is withdrawn and will have continual access to the cocktail throughout the feed withdrawal period. The cocktail may also be administered to fowl not subjected to feed withdrawal or it may be administered to fowl that are temporarily subjected to feed withdrawal. Generally, the water supply is replaced by the cocktail.

The following examples are intended only to further illustrate the invention and are not intended to limit the scope of the invention as defined by the claims.

EXAMPLE I

Materials and Methods

Husbandry: Five wk old broilers were obtained from local commercial growers, divided into groups of 6 each, and placed in pens containing litter. Broilers were provided feed and water ad libitum for 1 week. Feed was a corn-soybean meal, pelleted ration (3,200 ME/kg and 19% CP) supplemented with coban60 (750 g/metric ton) and bacitracin (62.5 g/metric ton). Water was provided in bell shaped waters. Five days before initiating feed withdrawal, broilers were orally challenged with $10^9$ of a nalidixic acid, novobiocin resistant Salmonella typhimurium strain Cocktail preparation and feed withdrawal: Cocktails were composed of 10 g/l proteose peptone (Difco Laboratories, Detroit, Mich.); 5 g/l beef extract (Sigma Chemica Co., St. Louis, Mo.); 5 g/l yeast extract (Difco Laboratories, Detroit, Mich.); 1 g/l polyoxyethylene-sorbitan monooleate (Tween 80)(Sigma Chemica Co., St. Louis, Mo.); 0.5 g/l magnesium sulfate, heptahydrate (Sigma Chemica Co., St. Louis, Mo.); and 0.2 g/l manganese sulfate, monohydrate (Sigma Chemica Co., St. Louis, Mo.). The cocktail was supplemented with D-(+)-glucose (Sigma Chemica Co., St. Louis, Mo.) at concentrations between 0 and 15% (w/v). The pH of the cocktails was adjusted to 6.0 with a solution of 3 parts 1 M acetic acid, glacial (Sigma Chemical Co., St. Louis, Mo.) and 1 part 1M propionic acid (Sigma Chemica Co., St. Louis, Mo.). Cocktails were autoclaved at 121° C. for 15 min then stored at 4° C. until ready for use.

In Trial 1, broilers were transferred from pens to battery cages 24 h before feed withdrawal was initiated. Four hours before feed was removed from broilers in the battery cages or broilers in the pens, water was removed from the troughs of the cages and from the bell drinkers of the pens. Troughs of the cages were filled with the glucose cocktail, and bell drinkers in the pens were connected to carboys containing the cocktails or water. Feed withdrawal was initiated by removing the troughs containing the feed from the cages and by removing feeders from the pen while allowing continued access to the cocktails or water. In Trials 2, 3, and 4 the broilers remained in pens on litter during feed withdrawal. Broilers were subjected to a total feed withdrawal period of 12 h.

Collection and analysis of crops: After feed withdrawal, broilers were transported to a pilot plant processing area and processed by stunning, scalding, and picking. Crops were aseptically removed from the carcasses. Crops from 5 broilers in each group were placed in separate sterile plastic bags (Tekmar, Cincinnati, Ohio), weighed, and blended in 20 mL of sterile distilled water in a Stomacher Lab-Blender (Seward Medical Ltd., London, SE1 1PP, UK) for 1 min (Hinton, A., Jr., et al., "Physical, chemical, and microbiological changes in the crop of broiler chickens subjected to incremental feed withdrawal", Poultry Sci., 79:212–218 (1999)). The pH of the suspensions were measured electronically (Fisher Acumet Meter, Pittsburgh, Pa.). Serial dilutions were made in 0.1% peptone water and plated on Violet Red Bile Glucose Agar (VRBG)(Oxoid Inc., Ogdensburg, N.Y.) for isolation of Enterobacteriaceae, on BG Sulfa (BGS)(Fisher Acumet Meter, Pittsburgh, Pa.) with 150 g/mL of nalidixic acid (Oxoid Inc., Ogdensburg, N.Y.) and 25 g/mL novobiocin (Oxoid Inc., Ogdensburg, N.Y.) for isolation of S. typhimurium, and on Lactic Acid Bacteria Agar (LAB)(Atlas, R. M., Handbook of Microbiological Media, edited by L. C. Parks, 1993, CRC Press, Boca Raton, Fla.) for isolation of lactic acid bacteria. VRBG and BGS plates were incubated aerobically 35°–37° C. for 18–24 h. Typical salmonellae colonies on BGS plates were confirmed as S. typhimurium by biochemical tests using Triple Sugar Iron Agar (Difco Laboratories, Detroit, Mich.) and Lysine Iron Agar (Difco Laboratories, Detroit, Mich.) and by serological tests with Salmonella O antiserum Poly A (Difco Laboratories, Detroit, Mich.) and Salmonella O Antiserum Group B, Factors 1,4,5,12 (Difco Laboratories, Detroit, Mich.). LAB plates were incubated anaerobically in a Coy Controlled Environment Chamber (Coy Laboratory Products, Inc., Grass Lake, Mich.) at 35°–37° C. for 48 h.

Statistical analysis: Experimental data were analyzed using GraphPad InStat version 3.00 for Windows 95 (GraphPad Software, San Diego, Calif.; www.graphpad.com) to perform One-Way Analysis of Variance (ANOVA). When ANOVA detected significant differences in group means, Tukey Multiple Comparisons Test was used determine significant differences in group means. All significant differences were determined at $P<0.05$. The results of Trials 3 and 4 were combined and treated as one trial since the trials were replicates and there was no significant difference in the data from these experiments.

Trial 1: Providing broilers a cocktail supplemented with 0–4% glucose while subjecting the animals to feed withdrawal in battery cages had no significant effect on the crop weight or on the number of *S. typhimurium* recovered from the crop (Table 1). Average crop weights for the experimental groups ranged from 6.62 to 7.96 g. The average number of colony-forming-units (cfu) of *S. typhimurium*/g recovered from the crop of broilers provided the cocktail ranged from a mean of log 0.89 to 2.31.

Varying the amount of glucose contained in the cocktails provided to the broilers during feed withdrawal did produce significant changes in crop pH and in the number of lactic acid bacteria recovered from the crops. There was no significant difference in the crop pH of broilers provided the cocktail supplemented with 0 or 2% glucose. The mean pH of the crops of broilers provided the cocktail supplemented with 0% glucose was 6.41, while the mean pH of the crop of broilers provided 2% glucose was 6.44. The mean pH of the crop of broilers provided the cocktail supplemented with 4% glucose was 6.2, which was significantly lower than the pH of the crop of broilers provided the cocktail supplemented with 0 or 2% glucose. There was no significant difference in the number of lactic acid bacteria recovered from the crop of broilers provided the cocktail supplemented with 0 (log 7.49 cfu/mL) or 2% (log 7.55 cfu/mL) glucose. The mean of log 8.77 cfu/g of lactic acid bacteria recovered from the crop of broilers provided the cocktail supplemented with 4% glucose was significantly higher than the number of lactic acid bacteria recovered from the crops of broilers provided 0 or 2% glucose.

Trial 2: Providing the broilers cocktails supplemented with 0–15% glucose while the animals were subjected to feed withdrawal on litter produced no significant change in the crop weights or in the number of lactic acid bacteria or *S. typhimurium* recovered (Table 2); the Salmonella data in Table 2 was not significantly different because the number of Salmonella in the control group was so low. Crop weights ranged from a mean of 5.29 to 9.09 g in broilers used in this trial. The number of crop lactic acid bacteria ranged from a mean of log 6.58 cfu/g in broilers provided the cocktail supplemented with 0% glucose to a mean of log 7.08 cfu/g in broilers provided the cocktail supplemented with 15% glucose. No *S. typhimurium* were recovered from broilers provided the cocktail supplemented with 7.5% glucose, while an average of log 1.76 or 1.02 cfu of *S. typhimurium*/g were recovered from the crops of broilers provided the cocktails supplemented with 0 or 15% glucose, respectively.

Providing broilers cocktails supplemented with different concentrations of glucose produced significant changes in the crop pH and in the number of Enterobacteriaceae recovered from the crops of broilers used in this trial. There was no significant difference in the pH of the crops of broilers provided cocktails supplemented with 0 or 7.5% glucose; however, the crop pH of broilers provided the cocktail supplemented with 15% glucose was a significantly lower than the pH of the crops of broilers provided cocktails supplemented with 0 or 7.5% glucose. The number of Enterobacteriaceae recovered from the crops of broilers provided the cocktails supplemented with 7.5% glucose was significantly lower than the number of Enterobacteriaceae recovered from the crops of broilers supplemented with 0 or 15% glucose. The number of Enterobacteriaceae recovered from the crops of broilers provided the cocktail supplemented with 7.5% glucose was log 1.17 lower than the number of Enterobacteriaceae recovered from the crop of broilers provided the cocktails that were not supplemented with glucose, and log 0.68 lower than the number of Enterobacteriaceae recovered from the crops of broilers provided 15% glucose.

Trials 3 and 4: There were no significant differences in the crop weights of broilers providing either water or cocktails supplemented with 0.0 or 7.5% glucose during feed withdrawal (Table 3). The average crop weights of the broilers in these trials was between 5.61 and 7.23 g.

Providing broilers the cocktail supplemented with 7.5% glucose did produce significant changes in the crop pH and the number of lactic acid bacteria, Enterobacteriaceae, and *S. typhimurium* recovered from the crop. There was no significant difference in the crop pH of broilers provided water or cocktail that was not supplemented with glucose; however, the pH of the crops of these broilers was significantly higher than the pH of the crops of broilers provided the cocktail supplemented with 7.5% glucose. The crop pH of broilers provided the cocktail supplemented with 7.5% glucose was 0.38 pH units lower than the pH of the crops provided water and 0.54 pH units lower than the pH of the crops of broilers provided the cocktail supplemented with 0.0% glucose. Significantly more lactic acid bacteria were also recovered from the crops of broilers provided the cocktail supplemented with 7.5% glucose than from the crops of broilers provided water or the cocktail that was not supplemented with glucose. There was no significant difference in the number of Enterobacteriaceae or *S. typhimurium* recovered from the crops of broilers provided water or the cocktail that was not supplemented with glucose; however, significantly fewer Enterobacteriaceae and *S. typhimurium* were recovered from the crops of broilers provided the cocktail supplemented with 7.5% glucose than from the crops of broilers provided water or the cocktail supplemented with 0.0% glucose. Log 0.69 fewer Enterobacteriaceae were recovered from the crops of broilers provided cocktail supplemented with 7.5% glucose than from the crops of broilers provided the cocktail that was not supplemented with glucose, and there were log 0.74 fewer Enterobacteriaceae recovered from the crops of broilers provided the cocktail supplemented with 7.5% glucose than from the crops of broilers provided water. No *S. typhimurium* were recovered from the crops of broilers provided the cocktail supplemented with 7.5% glucose; however, a mean of log 2.77 and 2.75 cfu/g of *S. typhimurium* were recovered from the crops of broilers provided water or the cocktail that was not supplemented with glucose, respectively.

TABLE 1

Effect of consumption of cocktail supplemented with various concentrations of glucose on weight, pH, and the number of lactic acid bacteria and *S. typhimurium* in the crops of broilers subjected to feed withdrawal.

| | | | Log colony forming units of crop bacteria/g | |
|---|---|---|---|---|
| % glucose in cocktail | Crop weight (g) | Crop pH | Lactic acid bacteria | *S. typhimurium* |
| 0.0 | $7.96^a \pm 1.29$ | $6.41^a \pm 0.86$ | $7.49^a \pm 0.15$ | $1.38^a \pm 1.30$ |
| 2.0 | $7.83^a \pm 1.73$ | $6.44^a \pm 0.06$ | $7.55^a \pm 0.19$ | $2.31^a \pm 1.57$ |
| 4.0 | $6.62^a \pm 1.01$ | $6.20^b \pm 0.13$ | $8.77^b \pm 0.31$ | $0.89^a \pm 1.30$ |

Values are means ± standard deviations. n = 5.
$^{a-b}$Different superscripts indicate significant differences between broilers provided cocktail with no glucose and broilers provided cocktail with glucose.

TABLE 2

Effect of consumption of cocktail supplemented with various concentrations of glucose on weight and the number of lactic acid bacteria and *S. typhimurium* in the crops of broilers subjected to feed withdrawal.

| % glucose in cocktail | Crop weight (g) | Crop pH | Log colony forming units of crop bacteria/g | | |
|---|---|---|---|---|---|
| | | | Lactic acid bacteria | Enterobacteriaceae | *S. typhimurium* |
| 0.0 | $6.19^a \pm 1.78$ | $6.54^a \pm 0.03$ | $6.58^a \pm 0.70$ | $5.22^a \pm 0.62$ | $1.76^a \pm 1.77$ |
| 7.5 | $9.09^a \pm 4.05$ | $6.47^a \pm 0.15$ | $6.97^a \pm 1.01$ | $4.05^b \pm 0.89$ | $0.00^a \pm 0.00$ |
| 15.0 | $5.29^a \pm 0.97$ | $6.29^b \pm 0.17$ | $7.08^a \pm 0.40$ | $4.68^{ab} \pm 0.37$ | $1.02^a \pm 0.93$ |

Values are means ± standard deviations. n = 5.
$^{a-b}$Different superscripts indicate significant differences between broilers provided cocktail with no glucose and broilers provided cocktail with glucose.

TABLE 3

Effect of consumption of water or cocktail supplemented with various concentrations of glucose on weight and the number of lactic acid bacteria and *S. typhimurium* in the crops of broilers subjected to feed withdrawal.

| % glucose in cocktail | Crop weight (g) | Crop pH | Log colony forming units of crop bacteria/g | | |
|---|---|---|---|---|---|
| | | | Lactic acid bacteria | Enterobacteriaceae | *S. typhimurium* |
| Water | $7.23^a \pm 3.78$ | $6.38^a \pm 0.26$ | $6.72^a \pm 0.60$ | $5.33^a \pm 0.57$ | $2.77^a \pm 1.20$ |
| 0.0 | $5.61^a \pm 0.98$ | $6.54^a \pm 0.10$ | $6.41^a \pm 0.43$ | $5.28^a \pm 0.54$ | $2.75^a \pm 1.19$ |
| 7.5 | $5.66^a \pm 1.12$ | $6.00^b \pm 0.31$ | $7.67^b \pm 0.35$ | $4.59^b \pm 0.63$ | $0.00^b \pm 0.00$ |

Values are means ± standard deviations. n = 10.
$^{a-c}$Different superscripts indicate significant differences between broilers provided cocktail with no glucose and broilers provided cocktail with glucose.

The above findings show that providing a glucose-based cocktail to broilers that are denied access to feed maintained the crop's natural ability to inhibit the growth of *S. typhimurium* and other Enterobacteriaceae during feed withdrawal. The concentration of carbohydrate in the cocktail was a major factor in determining the efficacy of the cocktail. As shown above, increasing the glucose concentration of the cocktail resulted in an increase in the population of crop lactic bacteria and reductions in crop pH in all trials in the present study. Recovery of *S. typhimurium* and significantly higher numbers of Enterobacteriaceae from the crops of broilers provided water or cocktails containing no glucose or lower glucose concentrations illustrate that these solutions were not able to produce the desired level of anti-Enterobacteriaceae activity in the crop. Conversely, providing broilers cocktails containing an excess concentration of glucose (15%) illustrated that Enterobacteriaceae present in the crop may overcome the anti-Enterobacteriaceae activity of the crop in an environment containing high levels of nutrients. Optimal glucose concentrations for producing anti-Enterobacteriaceae in the crop was found to be 7.5%. Without being bound by theory, this glucose concentration was high enough to maintain the growth and metabolism of crop lactic acid bacteria yet low enough that residual substrate will not be available to be utilized for metabolism and growth by Enterobacteriaceae. The effective concentration of other carbohydrates may be determined in a similar manner and it is expected that other carbohydrates will be effective in reducing Salmonella and other Enterobacteriaceae in fowl subjected to feed withdrawal.

As shown above, broilers provided the proper glucose-based cocktail during feed withdrawal had lower levels of *S. typhimurium* and other Enterobacteriaceae in their crops than animals that were not provided these cocktails. Consumption of the cocktail during feed withdrawal does not inhibit the evacuation ingesta in the crop; therefore, the alimentary tract of the animals was emptied as in standard feed withdrawal regimens. During processing, contents of the crop may leak and contaminate the carcass with ingesta and potentially harmful microorganisms (May, J. D., and J. W. Deaton, Poultry Sci., 68:627–630 (1989)). Providing broilers a carbohydrate (e.g., glucose) based cocktail during feed withdrawal could therefore play a role in reducing the number of food borne illnesses associated with poultry by reducing the number of food borne pathogens carried in the crop of these animals.

EXAMPLE II

Materials and Methods

Husbandry: On Day 1, five wk old broilers were obtained from local commercial growers and transported to a poultry housing facility. Broilers were obtained from different flocks for each of the 3 trials. All broilers were orally challenged with $10^9$ of a nalidixic acid resistant *Salmonella typhimurium* strain ST-10 and divided into treatment groups of 6 broilers each. Treatment groups were placed in separate pens furnished with wood shaving flooring materials. Feed and water were provided ad libitum under continous lighting. Feed was a corn-soybean meal, pelleted grower ration (3,200 ME/kg and 19% CP). Water was provided in bell shaped drinkers. On Day 2 (24 h after the first *S. typhimurium* challenge) a second oral challenge of $10^9$ of *S. typhimurium* was administered to each broiler.

Cocktail Preparation and Feed Withdrawal: Basal feed withdrawal cocktails were prepared that contained 10 g/l proteose peptone (Difco Laboratories, Detroit, Mich.); 5 g/l beef extract (Sigma Chemical Co., St. Louis, Mo.); 5 g/l yeast extract (Sigma Chemical Co., St. Louis, Mo.); 1 g/l polyoxyethylene-sorbitan monooleate (Tween 80) (Sigma Chemical Co., St. Louis, Mo.); 0.5 g/l magnesium sulfate, heptahydrate (Sigma Chemical Co., St. Louis, Mo.); and 0.2 g/l manganese sulfate, monohydrate (Sigma Chemical Co., St. Louis, Mo.). Basal cocktails were supplemented with appropriate concentrations (w/v) of D-(+)-glucose (Sigma Chemical Co., St. Louis, Mo.) or sucrose (Sigma Chemical Co., St. Louis, Mo.). Additionally, some cocktails used in Trial 3 were also supplemented with fumaric acid (0.05 or 0.1%, w/v) (Sigma Chemical Co., St. Louis, Mo.) or malic acid (0.05, w/v) (Sigma Chemical Co., St. Louis, Mo.). The pH of all cocktails was adjusted to 6.0 with a solution of 3 parts 1 M acetic acid, glacial (Sigma Chemical Co., St. Louis, Mo.) and 1 part 1M propionic acid (Sigma Chemical Co., St. Louis, Mo.). Cocktails were autoclaved at 121° C. for 15 min then stored at 4° C. until ready for use.

Feed withdrawal was initiated by removing feed from pens on Day 2, 12 h before the broilers were to be processed on Day 3. Four h before feeders were removed from the pens, waterers were emptied, and plastic tubing was used to connect the waterers to carboys containing the cocktails. After broilers were provided the cocktail with feed for 4 h, feed was removed and the 12 h feed withdrawal period began. In Trial 1, broilers were provided cocktails supplemented with either no carbohydrate, 4% glucose, or 2 or 4% sucrose. In Trial 2, broilers were provided cocktails supplemented with either 4, 6, 8, or 10% sucrose. In Trial 3, broilers were provided 4.5% sucrose cocktails supplemented with either no organic acid, 0.05% fumaric acid, or 0.05 or 0.10% malic acid. Control groups of broilers that were provided water instead of cocktails during feed withdrawal were included in all 3 trials.

Collection and Analysis of Crops: At the end of the feed withdrawal period, broilers from each group were placed in separate coops and transported to a pilot plant poultry processing facility. For each trial, broilers from different treatment groups were processed separately by electrocution, hot water scald, and mechanical picking. Crops of broilers were aseptically removed, and 5 of the 6 crops were selected for further analysis. Each crop was placed in a separate sterile plastic bag (Tekmar, Cincinnati, Ohio), weighed, and blended with 20 mL of sterile distilled water in a Stomacher Lab-Blender (Seward Medical Ltd., London SE1 1PP, U.K.) for 1 min on normal speed. The pH of the suspensions were measured electronically (Fisher Acumet Meter, Pittsburgh, Pa.). Serial dilutions of the crop suspensions were prepared in 0.1% peptone and spread on the appropriate bacteriological medium. Lactic acid bacteria were enumerated on Lactic Acid Bacteria Agar (LAB) (Atlas, 1993). Inoculated LAB plates were incubated anaerobically in a Coy Controlled Environment Chamber (Coy Laboratory Products, Inc., Grass Lake, Mich.) at 35° C. for 48 h. *S. typhimurium* were enumerated by plating suspensions on BG Sulfa (BGS)(Seward Medical Ltd., London SE1 1PP, U.K.) Agar supplemented with 150 µg/mL of nalidixic acid (Fisher Acumet Meter, Pittsburgh, Pa.) and 25 µg/mL novobiocin (Fisher Acumet Meter, Pittsburgh, Pa.). BGS plates were incubated aerobically between 35° C. for 18 to 24 h. Salmonellae-like colonies from BGS plates were confirmed as *S. typhimurium* by biochemical tests using Triple Sugar Iron Agar (Difco Laboratories, Detroit, Mich.) and Lysine Iron Agar (Difco Laboratories, Detroit, Mich.) and by serological tests with Salmonella O antiserum Poly A (Difco Laboratories, Detroit, Mich.) and Salmonella O Antiserum Group B, Factors 1, 4, 5, 12 (Difco Laboratories, Detroit, Mich.). Campylobacter were enumerated on Campylobacter Agar, Blaser (Seward Medical Ltd., London SE1 1PP, U.K.). Inoculated Campylobacter plates were incubated at 42° C. under microaerophilic conditions produced by an activated BBL CampyPak Plus (Seward Medical Ltd., London SE1 1PP, U.K.) gas generator envelope inca BBL GasPak Jar System. Campylobacter-like colonies were confirmed using the Latex-CAMPY(jcl)™ Campylobacter Culture Confirmation Test (Fisher Acumet Meter, Pittsburgh, Pa.). Direct plating on each medium could detect as few as 20 colony forming units (CFU)/ml.

Crop suspensions were also enriched to detect lower levels (<20 CFU/ml) of Salmonella and Campylobacter. Salmonella enrichment was performed by adding 1 ml of the crop suspension to 10 ml of Universal Enrichment Broth (Acumedia Manufacturers, Inc., Baltimore, Md.). Inoculated tubes were incubated aerobically at 37° C. for 24 h. Contents of the incubated enrichment cultures were streaked on BGS supplemented with nalidixic acid and novobiocin. The streaked plates were incubated aerobically at 37° C. for 18 to 24 h, and salmonellae-like colonies were confirmed as S. typhimurium using previously described biochemical and serological tests. Campylobacter enrichments consisted of transferring 1 ml of the crop suspensions to tubes containing 10 ml of Campylobacter Enrichment Broth (Acumedia Manufacturers, Inc., Baltimore, Md.). Inoculated tubes were incubated at 42° C. under microaerophilic conditions in BBL GasPak Jar System with BBL CampyPak Plus gas generator envelope. Contents of the enrichment tubes were streaked on Campylobacter Agar, Blaser, and the plates were incubated at 42° C. under microaerophilic conditions. Campylobacter-like colonies were confirmed as described above.

Statistical Analysis: Group means (5 broiler crops per treatment) of data for each trial were compared to determine significant differences among experimental data. Data were analyzed using GraphPad InStat version 3.00 for Windows 95 (GraphPad Software, San Diego, Calif.) to perform One-Way Analysis of Variance (ANOVA). When ANOVA detected significant differences in group means, Dunnett's test was used to determine which of the treatment groups differed significantly from the control group. All significant differences were determined at $P<0.05$.

Trial 1: Results from Trial 1 indicated that the type and concentration of carbohydrate used to supplement cocktails provided to broilers during feed withdrawal can influence the ability of the crop to maintain its natural ability to inhibit the growth of foodborne pathogens (Table 4). The crops weights of broilers provided the basal cocktail and carbohydrate cocktails did not differ significantly from the crops weights of the broilers provided water during feed withdrawal. The pHs of the crops of the broilers provided the carbohydrate cocktails were approximately 0.3 to 0.4 units lower than the pHs of the crops of broilers provided water or the basal cocktail, but neither the crops of broilers provided the basal cocktail or the carbohydrate cocktails contained significantly more lactic acid bacteria than the crops of broilers that were provided water. Significantly fewer S. typhimurium and Campylobacter were recovered from the crops of broilers provided the cocktail supplemented with 4% sucrose than from the crops of broilers provided water during feed withdrawal, but there was no significant difference in the number of enteropathogens recovered from crops of the control broilers and broilers provided cocktails supplemented with no carbohydrate, 2% sucrose, or 4% glucose. Furthermore, after enrichment procedures no Campylobacter were recovered from the crops of 3 of 5 of the broilers provided the 4% sucrose cocktail, while the enrichment procedure recovered S. typhimurium and Campylobacter from the crops of each of the other broilers in the control group and other treatment groups in this trial.

Trial 2: Providing broilers the basal cocktail supplemented with several concentrations of sucrose significantly reduced the number of enteropathogens recovered from of the crops of broilers (Table 5). The crop weights of broilers provided cocktails supplemented with 4 to 10% sucrose did not differ significantly from crop weights of broilers provided water. Although, the pHs of the crops of broilers provided the sucrose cocktails were approximately 0.5 units less than the pH of the crops of broilers that were provided water during feed withdrawal, the number of lactic acid bacteria recovered from the crops of broilers provided sucrose cocktails were not significantly greater than the number of lactic acid bacteria recovered from the crops of broilers provided water. Significantly fewer S. typhimurium were recovered from the crops of broilers provided each of the sucrose cocktails than from the crops of broilers provided water during feed withdrawal. While enrichment procedures recovered S. typhimurium from the crops of each of the broilers provided water during feed withdrawal and from the crops of 4 of 5 of the broilers provided cocktails containing either 6, 8, or 10% sucrose, the pathogen was recovered from only 1 of 5 of the crops of broilers provided the 4% sucrose cocktail during feed withdrawal. Neither direct plating nor enrichment recovered Campylobacter from the crops of any broilers used in Trial 2.

TABLE 4

Changes in the weight; pH; and population of lactic acid bacteria, Salmonella typhimurium, and Campylobacter of the crop of broilers denied access to feed and provided cocktails supplemented with carbohydrates.

| Carbohydrate added to basal cocktail[1] | Crop weight (g)[2] | Crop pH[2] | Log cfu of crop bacteria/g tissue[2] | | | Number of positive crops after enrichment | |
|---|---|---|---|---|---|---|---|
| | | | Lactic acid bacteria | S. typhimurium | Campylobacter | S. typhimurium | Campylobacter |
| Water (Control) | 7.54 ± 1.64[a] | 6.73 ± 0.06 | 6.75 ± 0.60[a] | 1.37 ± 1.29[b] | 7.31 ± 0.12[b] | 5 of 5 | 5 of 5 |
| None | 7.23 ± 1.27[a] | 6.81 ± 0.17 | 6.70 ± 0.46[a] | 2.05 ± 1.22[b] | 7.61 ± 0.48[b] | 5 of 5 | 5 of 5 |
| 2% sucrose | 7.27 ± 1.05[a] | 6.38 ± 0.17 | 7.12 ± 0.50[a] | 0.90 ± 1.34[b] | 7.38 ± 0.05[b] | 5 of 5 | 5 of 5 |
| 4% sucrose | 6.90 ± 0.87[a] | 6.38 ± 0.23 | 7.03 ± 0.88[a] | 0.00 ± 0.00[a] | 4.22 ± 3.87[a] | 5 of 5 | 2 of 5 |
| 4% glucose | 7.11 ± 1.21[a] | 6.40 ± 0.32 | 7.22 ± 0.32[a] | 0.32 ± 0.71[b] | 6.98 ± 0.59[b] | 5 of 5 | 5 of 5 |

[a,b]Different superscripts indicate significant differences between values from crops of broilers provided water (controls) and broilers provided basal or carbohydrate cocktail during feed withdrawal.

TABLE 4-continued

Changes in the weight; pH; and population of lactic acid bacteria, *Salmonella typhimurium*, and Campylobacter of the crop of broilers denied access to feed and provided cocktails supplemented with carbohydrates.

| | | | Log cfu of crop bacteria/g tissue[2] | | | Number of positive crops after enrichment | |
|---|---|---|---|---|---|---|---|
| Carbohydrate added to basal cocktail[1] | Crop weight (g)[2] | Crop pH[2] | Lactic acid bacteria | *S. typhimurium* | Campylobacter | *S. typhimurium* | Campylobacter |

[1]Weight/volume
[2]Values are means ± standard deviations; n = 5.

TABLE 5

Changes in the weight; pH; and population of lactic acid bacteria, *Salmonella typhimurium*, and Campylobacter of the crop of broilers denied access to feed and provided cocktails supplemented with sucrose.

| | | | Log cfu of crop bacteria/g tissue[1] | | | Number of positive crops after enrichment | |
|---|---|---|---|---|---|---|---|
| Cocktail Supplements | Crop weight (g)[1] | Crop pH[1] | Lactic acid bacteria | *S. typhimurium* | Campylobacter | *S. typhimurium* | Campylobacter |
| Water (Control) | 7.94 ± 1.10[a] | 6.52 ± 0.21 | 7.34 ± 0.49[a] | 3.44 ± 0.52[b] | NR | 5 of 5 | NR |
| 4% sucrose | 9.18 ± 3.69[a] | 5.95 ± 0.57 | 7.88 ± 0.72[a] | 0.00 ± 0.00[a] | NR | 1 of 5 | NR |
| 6% sucrose | 7.98 ± 1.72[a] | 5.93 ± 0.61 | 7.21 ± 1.14[a] | 0.74 ± 1.06[a] | NR | 4 of 5 | NR |
| 8% sucrose | 7.62 ± 1.15[a] | 6.06 ± 0.43 | 8.11 ± 0.37[a] | 0.30 ± 0.67[a] | NR | 4 of 5 | NR |
| 10% sucrose | 7.62 ± 1.15[a] | 6.06 ± 0.43 | 7.61 ± 1.24[a] | 1.24 ± 1.18[a] | NR | 4 of 5 | NR |

[a,b]Different superscripts indicate significant differences between values from crops of broilers provided water (controls) and broilers provided basal or carbohydrate cocktail during feed withdrawal.
[1]Values are means ± standard deviations; n = 5.
NR = None recovered The above findings indicate that modifying the composition of carbohydrate based cocktails provided to broilers for 12 h during feed withdrawal influences the effectiveness of the cocktails in reducing the population of foodborne pathogens in the crops of the broilers. When broilers are denied access to feed, the crop's population of lactic acid bacteria decreases, the crop's pH increases (Corrier, D. E., et al., Avian Dis., 43:453–460 (1999); Hinton, A., et al., "Carbohydrate Based Cocktails That Decrease the Population of Salmonella and Campylobacter in the Crop of Broiler Chickens Subjected to Feed Withdrawal," in press (2000)), and the crop's natural ability to inhibit the growth of foodborne pathogens diminishes (Hargis, B. M., et al., Poultry Sci., 74:1548–1552 (1995); Ramirez, G. A., et al., Poultry Sci., 76:654–656 (1997)). Providing broilers a carbohydrate based cocktail during feed withdrawal helps the crop to maintain its natural ability to inhibit the growth of enteropathogens by providing native lactic acid bacteria with substrates required for growth and acid production (Hinton, A., et al., "Carbohydrate Based Cocktails That Decrease the Population of Salmonella and Campylobacter in the Crop of Broiler Chickens Subjected to Feed Withdrawal," in press (2000)). Some lactic acid bacteria are able to form slime layers and capsules composed of the polysaccharide, dextran, when grown on media supplemented with sucrose, but not when grown on media supplemented with glucose (Brock, T. D., et al., Biology of Microorganisms. Prentice Hall, Englewood Cliffs, N.J. (1994); Edwards, C. G., et al., Int. J. Syst. Evol Microbiol., 50:699–702 (2000)). The sticky dextran slime layers and capsules may help bacteria attach to surfaces (Wilcox, M. D., et al., J. Gen Microbiol., 139:929–935 (1993)), and these polysaccharides may serve as fermentation substrates for other bacteria. Without being bound by theory, the production and fermentation of dextrans by lactic acid bacteria in the crops of broilers provided the sucrose based cocktails may have been one of the factors that increased the effectiveness of sucrose based cocktails when compared to glucose cocktail in reducing crop contamination by enteropathogens. Other trials have indicated that supplementing cocktails with carbohydrate levels greater than the optimal concentration required for reduction of the enteropathogen population results in higher recovery of enteropathogens from the crop (Hinton, A., et al., "Carbohydrate Based Cocktails That Decrease the Population of Salmonella and Campylobacter in the Crop of Broiler Chickens Subjected to Feed Withdrawal," in press (2000)). Without being bound by theory, recovery of higher populations of enteropathogens from the crops of broilers provided cocktails supplemented with higher than optimal concentrations of carbohydrates may be due to enteropathogen growth stimulated by residual glucose or sucrose that is not metabolized by the lactic acid bacteria when the fermentative bacteria are provided excess substrate.

Variability in the effectiveness of the cocktails in reducing the levels of enteropathogens recovered from the crops of broilers in different trials may be related to the differences in the native bacteria flora of the crops of broilers from different flocks. The finding that Campylobacter were present in the crops of broilers used in Trial 1, but not in the crops of broilers used in Trial 2 was one indicator of differences in the crop microflora of the broilers from different flocks.

Consumption of the cocktails did not inhibit the normal evacuation of ingesta from the crop that is desired during feed withdrawal; therefore, providing the proper carbohydrate based cocktails to broilers during feed withdrawal reduces the number of foodborne pathogens present while still allowing the crop to empty.

All of the references cited herein are incorporated by reference in their entirety.

This application claims the benefit of U.S. Provisional Application No. 60/169,510, filed Dec. 7, 1999, which is incorporated herein by reference in its entirety.

Thus, in view of the above, the present invention concerns (in part) the following:

A method for reducing bacterial enteropathogens in fowl subjected to feed withdrawal, comprising or consisting essentially of or consisting of withdrawing feed from fowl and orally administering to said fowl an effective amount of a cocktail sufficient to reduce bacterial enteropathogens in the crop of said fowl, wherein said cocktail comprises water and a carbohydrate and optionally at least one member selected from the group consisting of a protein source, a vitamin source, an organic acid, an emulsifier, a mineral source, and mixtures thereof.

The above method, wherein said cocktail is administered to said fowl approximately zero to four hours prior to feed withdrawal.

The above method, wherein said carbohydrate is selected from the group consisting of monosaccharides, disaccharides, polysaccharides, and mixtures thereof.

The above method, wherein said monosaccharides are selected from the group consisting of glucose, fructose, mannose, galactose, and mixtures thereof, wherein said disaccharides are selected from the group consisting of maltose, sucrose, lactose, cellobiose, and mixtures thereof, and wherein said polysaccharides are selected from the group consisting of starch, amylose, glycogen, dextrins, and mixtures thereof.

The above method, wherein said protein source is an enzymatically hydrolyzed protein, wherein said vitamin source is autolyzed yeast, wherein said organic acid is fumaric acid, wherein said emulsifier is a polyoxyethylenesorbitan, and wherein said mineral source is selected from the group consisting of magnesium salt, manganese salt, and mixtures thereof.

The above method, wherein said fowl are poultry.

The above method, wherein said poultry are selected from the group consisting of chickens, turkeys, ducks, quail and geese.

The above method, wherein said poultry are chickens.

The above method, wherein said carbohydrate is glucose or sucrose.

The above method, wherein said carbohydrate is glucose.

The above method, wherein said cocktail contains about 6% to about 15% glucose.

The above method, wherein said cocktail contains about 7% to about 12% glucose.

The above method, wherein said cocktail contains about 7% to about 10% glucose.

The above method, wherein said cocktail contains about 7.5% glucose.

The above method, wherein said carbohydrate is sucrose.

The above method, wherein said cocktail contains about 1% to about 20% sucrose.

The above method, wherein said cocktail contains about 2% to about 15% sucrose.

The above method, wherein said cocktail contains about 4% to about 10% sucrose.

The above method according to claim 1, wherein said bacterial enteropathogens are selected from the group consisting of members of the Enterobacteriaceae family, Campylobacter species, and mixtures thereof.

The above method, wherein said bacterial enteropathogens are salmonellae.

The above method, wherein said bacterial enteropathogens are *Salmonella typhimurium*.

The above method, wherein said bacterial enteropathogens are selected from the group consisting of *Campylobacter jejuni, Campylobacter coli*, and mixtures thereof.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A method for reducing bacterial enteropathogens in fowl subjected to feed withdrawal, comprising withdrawing feed from fowl and orally administering to said fowl an effective amount of a cocktail sufficient to reduce bacterial enteropathogens in the crop of said fowl, wherein said cocktail comprises water, a carbohydrate, and at least one member selected from the group consisting of a protein source, a vitamin source, an organic acid, an emulsifier, a mineral source, and mixtures thereof, wherein said carbohydrate is selected from the group consisting of monosaccharides, disaccharides, and mixtures thereof.

2. The method according to claim 1, wherein said cocktail is administered to said fowl approximately zero to four hours prior to feed withdrawal.

3. The method according to claim 1, wherein said monosaccharides are selected from the group consisting of glucose, fructose, mannose, galactose, and mixtures thereof, and wherein said disaccharides are selected from the group consisting of maltose, sucrose, lactose, cellobiose, and mixtures thereof.

4. The method according to claim 1, wherein said protein source is an enzymatically hydrolyzed protein, wherein said vitamin source is autolyzed yeast, wherein said organic acid is fumaric acid, wherein said emulsifier is a polyoxyethylenesorbitan, and wherein said mineral source is selected from the group consisting of magnesium salt, manganese salt, and mixtures thereof.

5. The method according to claim 1, wherein said fowl are poultry.

6. The method according to claim 5, wherein said poultry are selected from the group consisting of chickens, turkeys, ducks, quail and geese.

7. The method according to claim 5, wherein said poultry are chickens.

8. The method according to claim 1, wherein said carbohydrate is glucose or sucrose.

9. The method according to claim 8, wherein said carbohydrate is glucose.

10. The method according to claim 9, wherein said cocktail contains from about 6% to about 10% glucose.

11. The method according to claim 9, wherein said cocktail contains about 7% to about 10% glucose.

12. The method according to claim 9, wherein said cocktail contains about 7.5% glucose.

13. The method according to claim 1, wherein said carbohydrate is sucrose.

14. The method according to claim 13, wherein said cocktail contains about 1% to about 10% sucrose.

15. The method according to claim 13, wherein said cocktail contains about 2% to about 4% sucrose.

16. The method according to claim 13, wherein said cocktail contains about 4% sucrose.

17. The method according to claim 1, wherein said bacterial enteropathogens are selected from the group consisting of members of the Enterobacteriaceae family, Campylobacter species, and mixtures thereof.

18. The method according to claim 1, wherein said bacterial enteropathogens are salmonellae.

19. The method according to claim 1, wherein said bacterial enteropathogens are *Salmonella typhimurium*.

20. The method according to claim 1, wherein said bacterial enteropathogens are selected from the group consisting of *Campylobacter jejuni, Campylobacter coli*, and mixtures thereof.

21. The method according to claim 1, wherein said cocktail comprises water, a carbohydrate, a protein source, a vitamin source, an organic acid, an emulsifier, and a mineral source, wherein said carbohydrate is selected from the group consisting of monosaccharides, disaccharides, and mixtures thereof.

22. The method according to claim 1, wherein said cocktail consists essentially of water, a carbohydrate, and at least one member selected from the group consisting of a protein source, a vitamin source, an organic acid, an emulsifier, a mineral source, and mixtures thereof, wherein said carbohydrate is selected from the group consisting of monosaccharides, disaccharides, and mixtures thereof.

23. The method according to claim 1, wherein said cocktail consists essentially of water, a carbohydrate, a protein source, a vitamin source, an organic acid, an emulsifier, and a mineral source, wherein said carbohydrate is selected from the group consisting of monosaccharides, disaccharides, and mixtures thereof.

24. The method according to claim 1, wherein said cocktail consists of water, a carbohydrate, and at least one member selected from the group consisting of a protein source, a vitamin source, an organic acid, an emulsifier, a mineral source, and mixtures thereof, wherein said carbohydrate is selected from the group consisting of monosaccharides, disaccharides, and mixtures thereof.

25. The method according to claim 1, wherein said cocktail consists of water, a carbohydrate, a protein source, a vitamin source, an organic acid, an emulsifier, and a mineral source, wherein said carbohydrate is selected from the group consisting of monosaccharides, disaccharides, and mixtures thereof.

26. The method according to claim 1, wherein said method consists essentially of withdrawing feed from fowl and orally administering to said fowl an effective amount of a cocktail sufficient to reduce bacterial enteropathogens in the crop of said fowl, wherein said cocktail comprises water, a carbohydrate and at least one member selected from the group consisting of a protein source, a vitamin source, an organic acid, an emulsifier, a mineral source, and mixtures thereof, wherein said carbohydrate is selected from the group consisting of monosaccharides, disaccharides, and mixtures thereof.

27. The method according to claim 1, wherein said method consists essentially of withdrawing feed from fowl and orally administering to said fowl an effective amount of a cocktail sufficient to reduce bacterial enteropathogens in the crop of said fowl, wherein said cocktail comprises water, a carbohydrate, a protein source, a vitamin source, an organic acid, an emulsifier, and, a mineral source, wherein said carbohydrate is selected from the group consisting of monosaccharides, disaccharides, and mixtures thereof.

28. The method according to claim 1, wherein said cocktail is orally administered to said fowl throughout the feed withdrawal period.

\* \* \* \* \*